United States Patent Office 3,229,000
Patented Jan. 11, 1966

3,229,000
ALKYL- OR ARYL-MERCAPTO-(SULPHOXIDO-, SULPHONO-) CARBOXYLIC ACID DERIVATIVES OF THIOPHOSPHORIC, THIOPHOSPHONIC AND THIOPHOSPHINIC ACID ESTERS AND PROCESSES FOR THEIR PRODUCTION
Walter Lorenz, Wuppertal-Vohwinkel, Hans-Gerd Schicke, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany
No Drawing. Filed Apr. 26, 1963, Ser. No. 276,087
10 Claims. (Cl. 260—943)

This application is a continuation-in-part of applications Serial No. 83,888, filed January 23, 1961, now abandoned, and Serial No. 186,338, filed April 10, 1962, now abandoned.

The present invention relates to and has as its objects new and useful insecticidal thio- or dithiophosphoric, phosphonic and -phosphinic acid derivatives and processes for their preparation. The new compounds of this invention may be represented by the following general formula

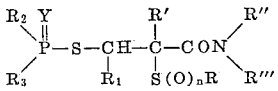

They possess an outsanding insecticidal activity and are consequently suitable for controlling insect pests. Furthermore, they are surprisingly much less toxic to warm-blooded animals than are the closest compounds of the prior art, as exemplified in U.S. Patent No. 2,815,312.

In this formula, R stands for an optionally substituted alkyl- or aryl-radical, $R_1$ is hydrogen or an alkyl radical, $R_2$ and $R_3$ stand for radicals which together with the remaining molecule residue form a derivative of a thio- or dithio-phosphoric-(onic) acid ester or amide or a thio- or dithio-phophinic acid ester, while Y stands for oxygen or sulphur and $n$ is zero, 1 or 2, R' is hydrogen or an alkyl radical R" and R'" stand for optionally substituted alkyl, cycloalkyl-, aralkyl- or aryl-radicals or can form with the nitrogen atom a heterocyclic ring system which may be interrupted by further hetero atoms; R" and R'" can also be hydrogen.

In contrast, the prior art compounds have the formula

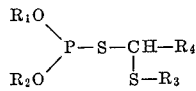

wherein $R_1$ and $R_2$ are low molecular aliphatic hydrocarbon radicals, $R_3$ is an alkyl or aralkyl radical which may be substituted, $R_4$ stands for —$COOR_5$,

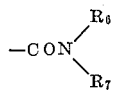

or —C≡N, each of $R_5$, $R_6$ and $R_7$ being a low molecular aliphatic hydrocarbon radical, and Y stands for O or S.

From copending U.S. patent application Ser. No. 83,888 there are known thio- or dithio-phosphoric-(onic- or inic) acid derivatives of the general formula

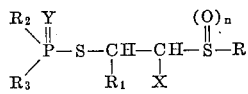

in which R stands for an optionally substituted alkyl- or aryl-radical, $R_1$ is hydrogen or an alkyl radical, $R_2$ and $R_3$ stand for radicals which together with the remaining molecule residue form a derivative of a thio- or dithio-phosphoric-(onic) acid ester or amide or a thio- or dithio-phosphinic acid ester, while X represents a carboxylic acid ester-, amide-, or nitrile-group, Y stands for oxygen or sulphurs and $n$ is zero, 1 or 2.

The compounds of the above general formula are distinguished by a good insecticidal and partly also by a systemic effect against a series of pest insects, and are, therefore, intended to be applied as pest control agents, mainly in plant protection.

In accordance with the present invention it has now been found that carboxylic acid amides of the formula

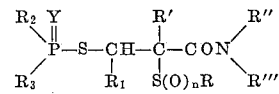

possess an outstanding insecticidal activity and are consequently suitable for controlling insect pests, particularly in view of their considerably reduced toxicity to warm-blooded animals.

In the last mentioned formula, R, $R_1$, $R_2$, $R_3$, Y and $n$ have the same meaning as given further above, while R' is hydrogen or an alkyl radical R" and R'" stand for optionally substituted alkyl, cycloalkyl-, aralkyl- or aryl-radicals or can form with the nitrogen atom a heterocyclic ring system which may be interrupted by further hetero atoms; R" can also be hydrogen.

The production of the compounds according to the invention proceeds in an analogous manner to that described in the main patent, i.e. by addition of optionally substituted alkyl- or aryl-sulphenic acid halides to α,β-unsaturated N-alkyl-, N-cycloalkyl-, N-aralkyl- or N-arylcarboxylic acid amides followed by reaction of the N-substituted α-alkyl- or α-aryl-mercapto-β-halocarboxylic acid amides formed, with salts of thio- or dithio-phosphoric-(onic) acid esters or acid amides or of thio- or dithio-phosphinic acids, and, if desired, subsequent oxidation of the resulting phosphorous-containing α-alkyl- or α-aryl-mecapto carboxylic acid derivatives, to the corresponding sulphoxido- or sulphono-compounds.

It is also possible, however, first to oxidise the N-substituted α-alkyl- or α-aryl mercapto-β-halocarboxylic acid amides e.g. with hydrogen peroxide, nitric acid, hypohalogenous acids, potassium permanganate or similar oxidising agents, to the corresponding β-halogen-sulphoxides or -sulphones and to react these further in the aforementioned way.

The following scheme illustrates the process according to the invention in more detail:

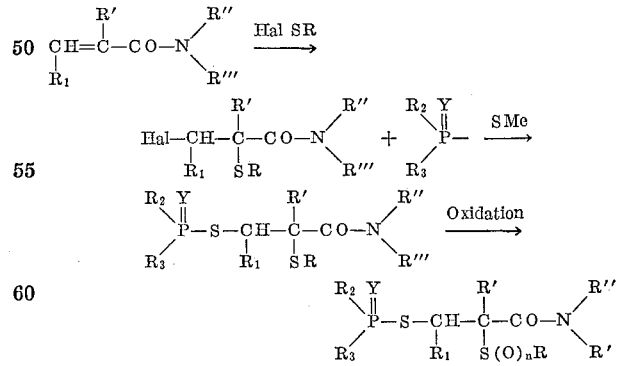

In the foregoing formulae R, R', R", R'", $R_1$, $R_2$, $R_3$ and Y have the significances given above, while Hal stands for a halogen atom, $n$ is equal to 1 or 2 and Me is an alkali metal, alkaline earth metal or ammonium ion.

The reactions according to the present invention are preferably conducted at elevated temperature (50 to 100° C.) and with the use of inert organic solvents. Lower aliphatic nitriles, e.g. acetonitrile, have proved especially suitable for this purpose. Furthermore, for the purpose of completing the reaction, and thus for achieving good yields, it is expedient to after-heat the reaction mixture after combining the starting components for a while (1 to 3 hours). The α-alkyl or α-aryl mercapto-(sulphoxido- or sulphono-) carboxylic acid derivatives obtainable according to the process of the invention, represent partly crystalline substances, partly colourless to weakly coloured oils mostly not distillable even in high vacuum.

The new compounds of the present invention very effectively kill insects like flies, mites, aphids, etc. They distinguish themselves especially by a good contact-insecticidal activity and at the same time by an activity on eating insects such as caterpillars. They may be used in the same manner as other known phosphoric acid insecticides, i.e. in a concentration from about 0.00001% to about 1%, diluted or extended with suitable solid or liquid carriers or diluents.

Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formula

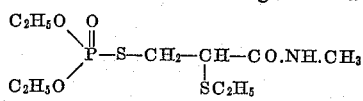

has been tested against aphids and spider mites. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) Against aphids (contact-insecticidal action) of the type *Doralis fabae*. Heavily infested bean plants (*Vicia faba*) have been sprayed drip wet with solutions as prepared above. The effect has been determined by evaluation after 24 hours by counting the dead pests either on the surface of the soil or still remaining on the plants. The following result has been obtained:

Aphids are killed completely with 0.001% solutions.

(b) Against spider mites (contact-insecticidal action). Bean plants (*Phaseolus vulgaris*) of about 15 inches height are sprayed drip wet with solutions prepared as indicated above. The bean plants have been infested heavily with the two-spotted spider (species *Tetranychus telarius*). Evaluation has been carried out after 24 hours, 48 hours, 8 days. The following results have been obtained:

Spider mites are killed completely with 0.001% solutions.

The following examples illustrate the process according to the invention:

*Example 1a*

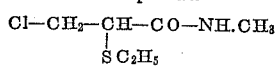

234 g. of ethyl sulphenic acid chloride dissolved in 500 cc. of carbon tetrachloride are added dropwise at 20° C. to a solution of 203 g. (2.5 mol) of acrylic acid N-monomethylamide in 500 cc. of carbon tetrachloride, the mixture is stirred for a further hour at 20° C. and the solvent distilled off in vacuum. The remaining residue crystallizes after standing for a short time and can be recrystallized from an ether/petroleum ether mixture. 410 g. are obtained (91% of the theoretical) of α-ethylmercapto-β-chloropropionic acid N-monomethylamide, of M.P. 50° C.

*Example 1b*

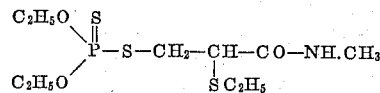

61 g. (0.3 mol) of O,O-diethylthionothiolphosphoric acid ammonium salt are dissolved in 250 cc. of acetonitrile. To this solution a solution is added dropwise at 70 to 80° C. of 54 g. of α-ethylmercapto-β-chloropropionic acid N-monomethylamide in 100 cc. of acetonitrile, the reaction mixture is warmed for an hour to 70 to 80° C. and poured after cooling to room temperature, into 100 cc. of water. The separated oil is taken up in methylene chloride, the methylene chloride solution is washed with water and dried over sodium sulphate. After evaporating the solvent the residue crystallizes from an ether/petroleum ether mixture. Yield: 70 g. (70.5% of the theoretical) of O,O-diethylthionothiolphosphoric acid-S-(β-ethylmercapto, β-N-methylaminocarbonyl-ethyl)ester of M.P. 64 to 65° C. The compound shows an ovicidal action against the eggs of the red spider. Aphids are killed completely with 0.001% solutions. Spider mites are 60% killed with 0.001% solution.

In an analogous manner, as described in Example 1b, the following compounds can be produced.

| Constitution | Physical properties and M.P., °C. where applicable |
|---|---|
| $\begin{array}{c}C_2H_5O\\\diagdown\\\phantom{C_2H_5O}P(=O)-S-CH_2-CH(SC_2H_5)-CO-NH\cdot CH_3\\\diagup\\C_2H_5O\end{array}$ | Oil. |

Aphids are killed completely with 0.001% solutions. Caterpillars are killed completely with 0.1% solution.

| | |
|---|---|
| $\begin{array}{c}CH_3O\\\diagdown\\\phantom{CH_3O}P(=S)-S-CH_2-CH(SC_2H_5)-CO-NH\cdot CH_3\\\diagup\\CH_3O\end{array}$ | Oil. |

Aphids are killed completely with 0.01% solutions. Systemic action with aphids on oats 0.1%=100% killing.

| | |
|---|---|
| $\begin{array}{c}C_2H_5O\\\diagdown\\\phantom{C_2H_5O}P(=S)-S-CH_2-CH(SC_2H_5)-CO-NH-CH_3\\\diagup\\CH_3\end{array}$ | Oil. |

Aphids are killed completely with 0.001% solutions. Mosquito larvae are killed to 100% with 0.0001%

| | |
|---|---|
| $\begin{array}{c}C_2H_5O\\\diagdown\\\phantom{C_2H_5O}P(=S)-S-CH_2-CH(SC_2H_5)-CO-NH-CH_3\\\diagup\\C_2H_5\end{array}$ | 104° to 106°. |

Spider mites are killed completely with 0.001% solutions. The compound has an ovicidal action. Systemic action with aphids on oats 0.1%=100% killing.

| | |
|---|---|
| $\begin{array}{c}CH_3\\\diagdown\\\phantom{CH_3}P(=S)-S-CH_2-CH(SC_2H_5)-CO-NH-CH_3\\\diagup\\CH_3\end{array}$ | 89° to 91° C. |

Aphids are killed completely with 0.1% solutions.

Systemic action with aphids on oats 0.1%=100% killing.

*Example 2a*

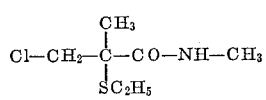

Under analogous reaction conditions to those described in Example 1a, there are obtained from 218 g. (2.2 mol) of methacrylic acid N-monomethylamide and 212 g. of ethylsulfenic acid chloride, 365 g. (85% of the theoretical) of α-methyl-α-ethylmercapto-β-chloro-propionic acid N-monomethylamide of B.P. 132° C./6-7 mm. Hg.

*Example 2b*

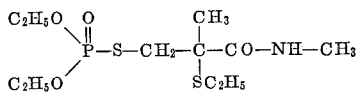

A solution of 37 g. (0.2 mol) of O,O-diethylthiolphosphoric acid ammonium salt in 200 cc. acetonitrile are treated at 70 to 80° C. with 49 grams of α-methyl-α-ethyl-mercapto-β-chloropropionic acid N-monomethylamide, dissolved in 50 cc. of acetonitrile, the mixture is stirred for a further hour at 70 to 80° C. and poured after cooling to room temperature, into water. The separated oil is taken up in methylene chloride. After drying the methylene chloride solution over sodium sulfate the solvent is distilled off and 55 g. are obtained (84% of the theoretical) of O,O-diethylthiolphosphoric acid-S - β - methyl - β - ethylmercapto - β - N - methylaminocarbonylethyl)-ester in the form of a weakly brown oil. Aphids and spider mites are killed completely with 0.001% solutions. The compound has an ovicidal action against the eggs of the red spider.

*Analysis.*—Calculated for a molecular weight of 329: P, 9.43%; S, 19.45%; N, 4.26%. Found: P, 9.19%; S, 19.42%; N, 4.19%.

In corresponding ways the following products may be prepared:

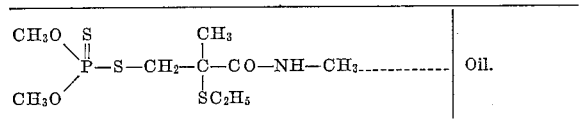

Toxicity on rats per os LD$_{50}$ 100 mg./kg. Caterpillars are killed completely with 0.1% solutions. Spider mites are killed completely with 0.001% solutions and aphids are killed completely with 0.01% solutions.

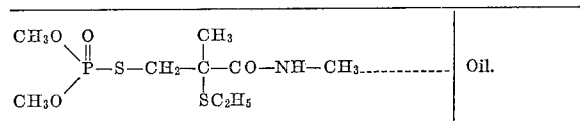

Spider mites are killed completely with 0.01% solutions. The compound shows an ovicidal action against the eggs of the red spider. Aphids are killed completely with 0.01% solutions.

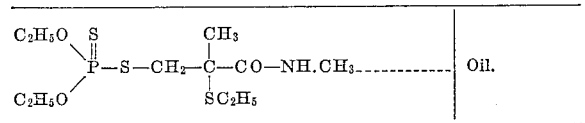

Spider mites are 60% killed with 0.0001% solution. Caterpillars are killed completely with 0.01% solution. The compound shows an ovicidal action against the eggs of the red spider.

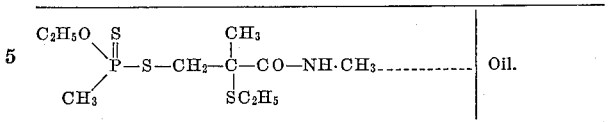

Aphids are 70% killed with 0.001% solution. Spider mites are 60% killed with 0.0001% solution. The compound shows an ovicidal action against the eggs of the red spider.

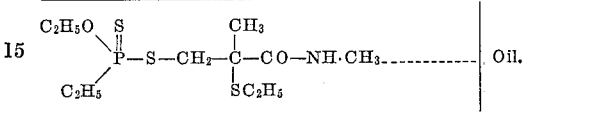

Aphids are killed completely with 0.001% solutions. Spider mites are killed completely with 0.001% solutions. The compound shows an ovicidal action against the eggs of the red spider.

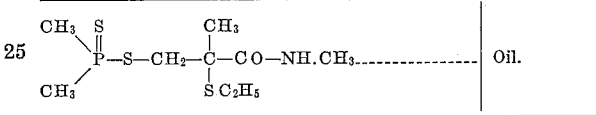

Spider mites are killed completely with 0.01% solutions. Caterpillars are killed completely with 0.01% solutions.

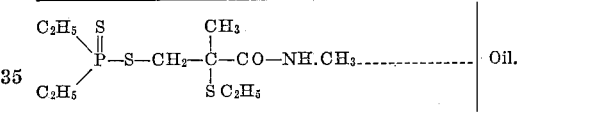

Caterpillars are killed completely with 0.1% solutions. Systemic action with aphids on oats 0.1%=100% killing.

*Example 3a*

In a manner corresponding to that described in Example 1a the following compounds can be obtained:

| Constitution | Yield (percent of theoretical) | Physical properties (M.P. in °C.) |
| --- | --- | --- |
| Cl—CH$_2$—CH(SH$_2$H$_5$)—CO—NH—C(CH$_3$)$_3$ | 81 | 98 to 100. |
| Cl—CH$_2$—CH(SCH$_3$)—CO—CH—C(CH$_3$)$_3$ | 76 | 90 to 92. |

*Example 3b*

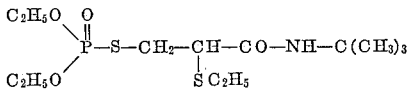

37.5 g. (0.2 mol) of O,O-diethylthiolphosphoric acid ammonium salt are dissolved in 250 cc. of acetonitrile, and a solution of 44.5 g. of α-ethylmercapto-β-chloropropionic acid N-tert.-butylamine in 100 cc. of acetonitrile is added dropwise at 70 to 80° C., the mixture is stirred for a further hour at the given temperature and then worked up as described in Example 1b or 2b. There are obtained 60 g. (84% of the theoretical) of O,O-diethylthiolphosphoric acid-S-(β-ethyl-mercapto, β-N-tert.-butylaminocarbonyl-ethyl)-ester in the form of a weakly yellowish oil.

Aphids are killed completely with 0.0001% solutions. Spider mites are killed completely with 0.01% solutions and 0.004% respectively. The compound shows an ovicidal action against the eggs of the red spider.

*Analysis.*—Calculated for a molecular weight of 357: P, 8.68%; S, 17.92%; N, 3.93%. Found: P, 8.67%; S, 18.54%; N, 4.04%.

In analogous manner the following compounds are obtained:

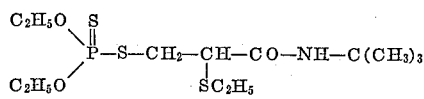

Aphids are killed completely with 0.01% solutions. Spider mites are killed completely with 0.01% solutions.

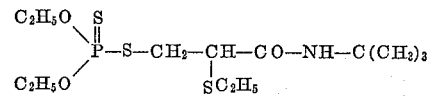

Aphids are killed completely with 0.01% solutions. Spider mites are killed completely with 0.01% solutions.

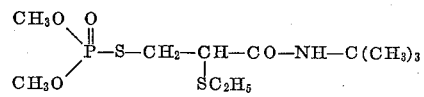

Aphids are killed completely with 0.01% solutions. Caterpillars are killed completely with 0.1% solutions.

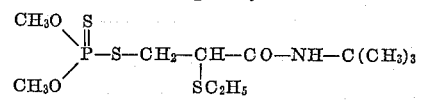

Aphids are killed completely with 0.01% solutions. Systemic action with aphids on oats 0.1%=100% killing.

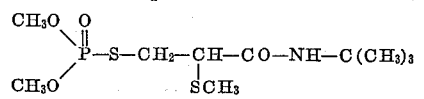

Aphids are killed completely with 0.01% solutions. Caterpillars are killed completely with 0.1% solutions.

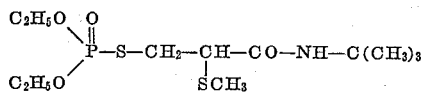

Aphids are killed completely with 0.01% solutions. Systemic action with aphids on oats 0.1%=100% killing. Toxicity on rats per os $LD_{50}$ 10 mg./kg.

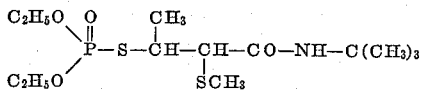

By oxidising the compound of Example 1b with about the calculating molecular amount of 30% hydroxide peroxide solution in glacial acetic acid there is obtained the following compound in almost quantitative yields in the form of a colourless undistilled oil.

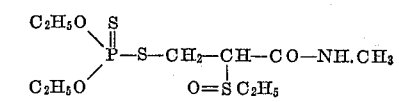

Oxidation of the compound of Example 1b or of the aforementioned sulphoxide with about the calculating amount of potassium permanganate in aqueous acetonic solution the lower temperatures around 0° C. there is obtained in almost quantitative yields the corresponding sulphone of the following formula

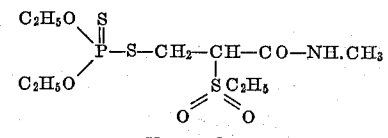

*Example 4a*

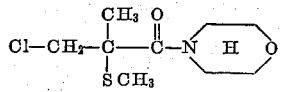

As described in Example 1a there are obtained 226 g. of α-methyl-α-methylmercapto - β-chloro-propionic acid morpholide in the form of a colorless oil from 155 g. (1 mol) of methacrylic acid morpholide and 82.5 grams (1 mol) of methyl-sulfenic acid chloride. Yield 94% of the theoretical.

*Example 4b*

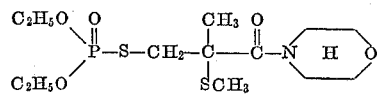

37.5 g. (0.2 mol) of the ammonium salt of diethyl-thiolphosphoric acid are dissolved in 150 cc. of acetonitrile. Thereto are added dropwise at 70–80° C. 47.5 g. of α-methyl-α-methylmercapto - β-chloro-propionic acid morpholide in 100 cc. of acetonitrile. The mixture is stirred for 1 hour at 70–80° C., and then cooled down to 20° C. The separated ammonium chloride is filtered off with suction. The solvent is distilled off in vacuum and the remaining parts taken up in methylen chloride, washed with water and dried. After separation of the solvent there is obtained a tough light yellow oil.

*Analysis.*—Calculated for mol 271: P, 8.35%; S, 17.25%; N, 3.78%. Found: P. 7.99%; S, 17.10%; N, 3.81%.

*Example 5a*

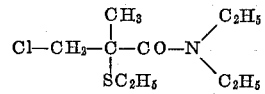

From 113 g. (0.8 mol) of methacrylic acid diethylamide and 77 g. of ethyl-sulfenic acid chloride there are obtained as described in Example 1. 129 grams of α-methyl-α-ethylmercapto-β-chloro-propionic acid diethylamide in the form of a colorless oil. Yield 68% of the theoretical.

*Example 5b*

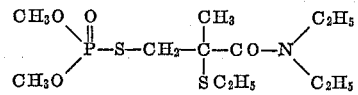

To a solution of 24 g. (0.15 mol) of the ammonium salt of dimethylthiolphosphoric acid in 200 cc. of acetonitrile there is added dropwise at 70–80° C. a solution of 35.5 g. of α-methyl α-ethylmercapto-β-chloro-propionic acid diethylamide in 100 cc. of acetonitrile. Stirring is continued for 1 hour at 70–80° C., and the mixture then is cooled down to 20° C., the separated crystals are filtered off with suction and the acetonitrile is separated by distillation in vacuum. The residue is taken up in methylen chloride, washed with water and dried. The solvent is then distilled off. There are obtained 37 g. of a yellow oil. Yield 72% of the theoretical.

*Analysis.*—Calculated for mol 343: P, 9.04%; S, 18.68%; N, 4.05%. Found: P, 9.24%; S, 18.45%; N, 4.12%.

*Example 6a*

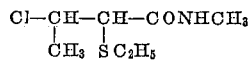

As described in the foregoing examples, there are obtained from 168 g. (1.7 mol) of crotonic acid monomethylamide and 164 g. of ethylsulfenic acid chloride 252 g. of α-ethylmercapto-β-chloro-butyric acid monomethylamide. Yield: 76% of the theoretical.

*Example 6b*

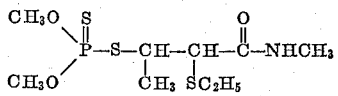

To a solution of 35 g. (0.2 mol) of the ammonium salt of dimethyldithiophosphoric acid in 150 cc. of acetonitrile there are added dropwise at 70–80° C. 39 g. of α-ethylmercapto-β-chloro-butyric acid monomethylamide in 100 cc. of acetonitrile. The mixture is afterstirred for 1 hour, cooled down to 20° C. and then poured into water. The separated oil is taken up in methylenchloride and dried over sodium sulfate. After distilling off the solvent there is obtained a brown-yellow oil. Yield: 41 g.=65% of the theoretical.

*Analysis.*—Calculated for mol 317: P, 8.79%; S, 30.25%; N, 4.42%. Found: P, 8.16%; S, 29.85%; N, 4.59%.

What is claimed is:
1. A compound of the formula

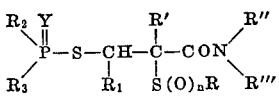

in which R stands for lower alkyl having up to 4 carbon atoms; $R_1$ stands for a member selected from the group consisting of hydrogen and lower alkyl having up to 4 carbon atoms; $R_2$ and $R_3$ stand for a member selected from the group consisting of lower alkyl and lower alkoxy, both lower alkyl and lower alkoxy having up to 4 carbon atoms; R' stands for a member selected from the group consisting of hydrogen and lower alkyl having up to 4 carbon atoms; R" stands for a member selected from the group consisting of hydrogen and alkyl; R''' stands for alkyl; and R" together with R''' and N stand for morpholino; $n$ stands for a whole number between 0 and 2; and Y stands for a member selected from the group consisting of oxygen and sulfur.

2. A compound of claim 1 wherein $R_2$ and $R_3$ are each lower alkoxy; $R_1$, R' and R" are each hydrogen; and R and R''' are each lower alkyl.

3. A compound of claim 1 wherein $R_2$ is lower alkoxy; $R_3$, R and R''' are each lower alkyl; and $R_1$, R' and R" are each hydrogen.

4. A compound of claim 1 wherein $R_2$ and $R_3$ are each lower alkoxy; R', R and R''' are each lower alkyl; and $R_1$ and R" are each hydrogen.

5. A compound of claim 1 wherein $R_2$, $R_3$, R', R and R''' are each lower alkyl and $R_1$ and R" are each hydrogen.

6. The compound of the following formula

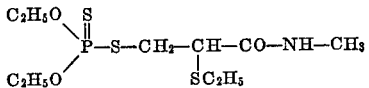

7. A compound of the following formula

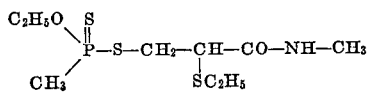

8. A compound of the following formula

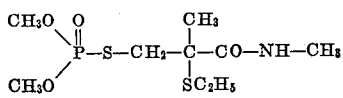

9. A compound of the following formula

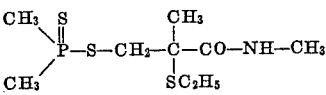

10. A compound of the following formula

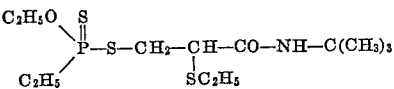

References Cited by the Examiner
UNITED STATES PATENTS
2,815,312   12/1957   Schuler _____ 260—461

CHARLES B. PARKER, *Primary Examiner.*